June 1, 1937. A. CHACHULA 2,082,684

PULLEY

Filed Dec. 9, 1935

INVENTOR.
Andrew Chachula
BY
ATTORNEY.

Patented June 1, 1937

2,082,684

UNITED STATES PATENT OFFICE 2,082,684

PULLEY

Andrew Chachula, West Allis, Wis.

Application December 9, 1935, Serial No. 53,686

2 Claims. (Cl. 74—230.6)

My invention relates to pulleys generally and has for an object to provide either a crowned or flat face type thereof with means to prevent undue slippage of a wrapping connection engaged therewith and lodgement of dirt on a pulley face which otherwise tends to cause a loss of frictional contact between the face and the wrapping connection and a consequent loss, and more particularly of power.

Another object of my invention is to provide a pulley having grooves so arranged on its peripheral face that all dirt which may have a tendency to lodge between a belt connector and the pulley face will be forced into the grooves and outward thereof at opposite sides of the pulley, thereby keeping the pulley surface clean at all times.

A further object of my invention is to so arrange the grooves on the face of the pulley, that they will aid in keeping the belt in proper alignment.

A still further object of my invention is to provide a pulley of the character described, that is easily manufactured, at a minimum cost, yet will efficiently perform the functions for which it is intended.

Other and further objects of my invention will become readily apparent to persons skilled in the art, from a consideration of the following description when taken in conjunction with the drawing wherein.

Figure 1:
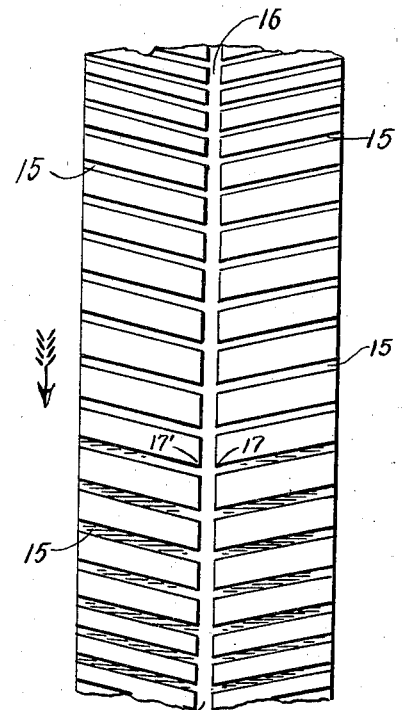
Fig. 1 is a fragment of the face of the improved pulley, showing a preferred arrangement of the grooves therein.
Figure 2:
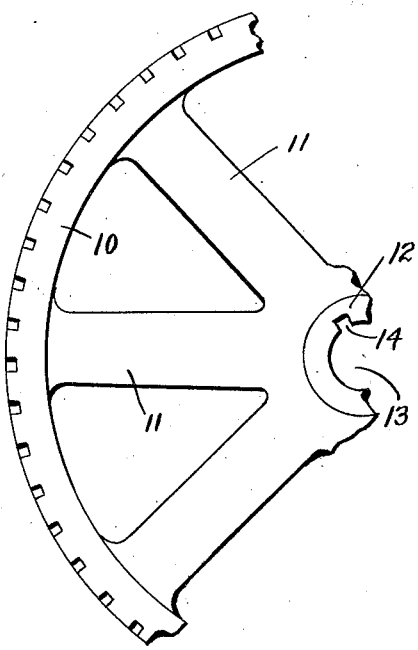
Fig. 2 is a fragmentary side view of the pulley.
Figure 3:
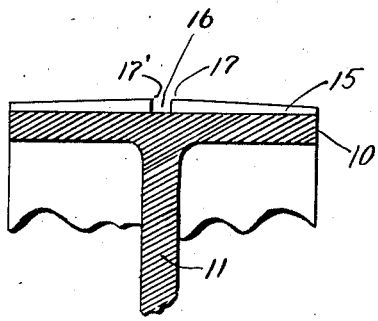
Fig. 3 is a fragmentary cross-section of a portion of the pulley.

Referring to the drawing wherein like characters of reference denote corresponding parts in the several views thereof, 10 shows a flange carried on the outer end of a plurality of spokes 11 radiating from a hub 12, the latter having its shaft engaging bore provided with a key-way 14, substantially as shown.

The face of the flange 10 is provided with oppositely arranged sets of circumferentially spaced grooves 15, the grooves being angularly disposed and equally spaced, circumferentially of the flange. The inner ends of the two sets of transverse grooves 15 open into a circumferentially extending groove 16 at the center of the flange face and the latter groove is preferably made somewhat wider than the groove 15.

It is evident to anyone familiar with the art, that any dirt or foreign matter that may ordinarily have a tendency to lodge between the face of the pulley and a belt engaged therewith, will find its way into the grooves 15 and 16 and the pulley revolving in the direction as indicated by the arrow in Fig. 1, will cause the dirt to be discharged from the outer ends of the grooves 15, the centrifugal force caused by the motion of the pulley, plus the angle of the grooves 15, causing this dirt to readily extricate itself without resistance, leaving the face of the pulley free for frictional contact with the belt. It will also be apparent that the points 17 and 17' on the face of the pulley produced by the angular relation between the grooves 15 and 16, will positively assist in retaining the belt in an aligned postion, thus preventing wear and adding to the life of the belt.

It is to be understood that the invention is applicable to any type of pulley, solid or split, wood or metal, crowned face or flat face, and will be equally efficient on any type of pulley. The pulley shown in the drawing is merely an example illustrating the object of my invention, which is susceptible to various changes in its form and minor details of construction, and the right is herein reserved to make such changes as properly fall within the scope of the appended claims.

Having thus described my invention, what I claim and desire to secure by Letters Patent in the United States is:

1. A pulley having sets of spaced transverse ribs formed on its peripheral face and a groove extending circumferentially of the center thereof, the spacing between said ribs forming laterally extending grooves opening at their inner ends into said circumferential groove and of a lesser width than the latter, said ribs having their top faces sloping from said circumferential groove to provide high edges at their inner ends for cooperation with a wrapping connector to prevent sidewise slippage of the latter relative to the pulley.

2. A crown faced pulley having sets of spaced oppositely angled ribs formed on its peripheral face and a groove extending circumferentially of the center thereof, the spacing between said ribs forming laterally extending grooves opening at their inner ends into said circumferential groove, said laterally extending grooves having their bottom walls parallel to the axis of the pulley to provide said ribs with gradually increasing thickness inwardly from their outer ends whereby high edges are formed at their inner ends of said ribs with a wrapping connector to prevent sidewise slippage of the latter relative to the pulley.

ANDREW CHACHULA.